US008600181B2

(12) United States Patent
Niemi et al.

(10) Patent No.: US 8,600,181 B2
(45) Date of Patent: Dec. 3, 2013

(54) METHOD FOR COMPRESSING IMAGES AND A FORMAT FOR COMPRESSED IMAGES

(75) Inventors: Sami Niemi, Skanor (SE); Martin Jacobsson, Lund (SE)

(73) Assignee: Mobile Imaging in Sweden AB, Lund (SE)

( * ) Notice: Subject to any disclaimer, the term of this patent is extended or adjusted under 35 U.S.C. 154(b) by 229 days.

(21) Appl. No.: 13/002,936

(22) PCT Filed: Jul. 8, 2009

(86) PCT No.: PCT/SE2009/000360
§ 371 (c)(1),
(2), (4) Date: Jan. 6, 2011

(87) PCT Pub. No.: WO2010/005360
PCT Pub. Date: Jan. 14, 2010

(65) Prior Publication Data
US 2011/0110600 A1    May 12, 2011

Related U.S. Application Data

(60) Provisional application No. 61/078,921, filed on Jul. 8, 2008.

(51) Int. Cl.
*G06K 9/36* (2006.01)
(52) U.S. Cl.
USPC ............ 382/239; 382/232; 382/233; 382/248
(58) Field of Classification Search
USPC .......... 382/100, 232, 233, 239, 248; 283/113; 348/469; 704/219; 375/240.01, 240.11, 375/240.13, 240.04
See application file for complete search history.

(56) References Cited

U.S. PATENT DOCUMENTS 5,128,757 A * 7/1992 Citta et al. ................ 375/240.01
5,337,087 A * 8/1994 Mishima .................. 375/240.04
(Continued)

FOREIGN PATENT DOCUMENTS

EP    0 239 076 A2    9/1987
EP    0 565 219 A2    10/1993
(Continued)

OTHER PUBLICATIONS

ITU-T Telecommunication Standardization Sector of ITU: "Series H: Audiovisual and Multimedia Systems Infrastructure of audiovisual services—Systems and terminal equipment for audiovisual services", H.323, (Jul. 2003), 298 pages.

(Continued)

*Primary Examiner* — Anh Do
(74) *Attorney, Agent, or Firm* — Alston & Bird LLP

(57) ABSTRACT

There is provided a method for compressing images and an image format. The method comprises performing a transform on pixel portions of image data and evaluating resulting coefficients from each transform in terms of a flatness condition. If the transform is found to be flat then the result from the transform is quantized according to a first quantizing scheme. If the transform is found not to be flat then the result from the transform is quantized according to a second quantizing scheme being different from the first quantizing scheme. Different block arranging schemes are proposed for the quantizing schemes. An indicator is stored in the block indicating that the image block is flat or not flat. The resulting bits are written into a compression data structure.

28 Claims, 4 Drawing Sheets

(56) References Cited

U.S. PATENT DOCUMENTS

| | | | | |
|---|---|---|---|---|
| 5,416,604 | A | 5/1995 | Park | 382/232 |
| 5,416,606 | A | 5/1995 | Katayama et al. | 382/239 |
| 6,185,312 | B1 * | 2/2001 | Nakamura et al. | 382/100 |
| 7,933,769 | B2 * | 4/2011 | Bessette | 704/219 |
| 8,275,209 | B2 * | 9/2012 | Schonberg et al. | 382/233 |
| 2006/0050881 | A1 | 3/2006 | Ahmed | 382/232 |

FOREIGN PATENT DOCUMENTS

| | | | |
|---|---|---|---|
| EP | 0 933 947 | A2 | 8/1998 |
| EP | 0 933 947 | A2 | 8/1999 |
| EP | 0 974 932 | A2 | 1/2000 |
| EP | 0 974 933 | A2 | 1/2000 |
| EP | 1 119 205 | A2 | 7/2001 |
| EP | 1 152 594 | A2 | 11/2001 |
| WO | 2006/018798 | A1 | 2/2006 |

OTHER PUBLICATIONS

International Search Report: PCT/SE2009/000360.
International Search Report: PCT/SE2009/000360, Oct. 16, 2009.
Rubino, E.M., et al., "*Improved Chen-Smith Image Coder*;" Journal of Electronic Imaging, vol. 4, No. 2. (1995) pp. 151-160.
Supplementary European Search Report and European Search Opinion for Application No. PCT/SE2009000360, dated May 14, 2013.

* cited by examiner

METHOD FOR COMPRESSING IMAGES AND A FORMAT FOR COMPRESSED IMAGES

TECHNICAL FIELD

The present invention relates to the field of digital image processing, and more particularly to a method for compressing images and an image format. There is also provided an apparatus and a computer program product thereof.

BACKGROUND

Digital image processing, such as compression, transmission, browsing and communications is common in the art. Typically early methods of digital image transmission and storage used so-called Pulse Code Modulation (PCM). More recent systems use more complicated digital compression techniques.

In some applications it may be advantageous to arrange a fast intermediate cache between a storage device carrying original images, and the display drives displaying the images on a screen. An example may be when several large megapixel images are to be viewed on a mobile phone display, or when graphical elements, such as PNG images are decoded to be later used in a graphical user interface.

Normally the original resources may be in a compressed file format such as JPEG (as standardized by the Joint Photographic Experts Group according to the standards ITU-T T.81, ISO/IEC IS 10918-1 and ITU-T T.84, see inter alia "The JPEG Handbook", by W. Pennebaker, J. Mitchell, Van Nostrand Reinhold, 1993), or PNG (Portable Network Graphics, which is a bitmapped image format that employs lossless data compression). Screens commonly display images in a RGB (Red, Green, Blue) format, such as RGB888. In such case it would possible to use for instance the raw RGB565 format or the raw YUV422 format or another well known compression format. It is important to save memory when implementing caches, and other storages comprising many graphical elements. Even if the above raw formats are fairly compact, being in the order of 16 bits per pixel, it would still be desirable to compress the data down to smaller size, while not consuming significantly much more CPU power. Hence, the raw formats are too large, and the compression formats are too slow.

SUMMARY

It would be useful to be able to encode an compressed image into a static size, so that the size of the resulting image is known before it is encoded. It could also be desirable to be able to quickly extract specific regions of the encoded image, without the need of decoding other areas or the entire image.

It is an object of the present invention to overcome the above problems, and to provide a compression method and a format that can be implemented to become exceptionally fast in converting to and from different data formats, particularly different luminance/chrominance data formats, such as YUV, YCbCr, YPbPr, or YIQ or different colour channel data formats, such as RGB.

Generally, the above objectives are achieved by a method, an apparatus and a computer program product according to the attached independent claims.

According to a first aspect, the above objects are achieved by a method for encoding an image, the method comprising: performing a block transform on block pixel portions of image data, evaluating resulting coefficients from each transform for flatness, if the transform is found to be flat then quantize the result from the block transform according to a first quantizing scheme, arrange the quantized bits into N−1 bits according to a first block arranging scheme, where N>0 is an integer, and store an indicator in the block indicating that the image block is flat, if the transform is found not to be flat then quantize the result from the block transform according to a second quantizing scheme, arrange the quantized bits into N−1 bits according to a second packet arranging scheme, and store a flatness indicator bit together with the block indicating that the image block is not flat, and write the resulting N bits into a compression data structure.

One advantage of the disclosed method is that it if fast and offer relatively good compression ratio.

Another advantage is that it results in coefficients that are independent allowing efficient lookup operations to be used when decoding it to different luminance/chrominance or colour channel formats.

Yet another advantage is that the output size is predetermined 6 bits per pixel, and allows for simple calculation to locate and extract areas of image data. It also allows for use-cases such as burst encoding of images from a camera sensor, where the resulting size of a number of images is predetermined. The use-case is difficult with sensors encoding the images with JPEG, as it's not possible to know how much space to allocate for the images, requiring one to allocate unnecessary amount of memory to be sure it's enough for a worst case scenario.

Yet another advantage is that it's possible to store multiple such compressed images encoded with the presented scheme into one or more files, where finding, storing, and replacing a specific image can be very efficient as each of the images are of predetermined size and are thus simple to locate and replace (as the size of two different images of same dimensions is same). The disclosed method presents a new fast to decode/encode image format, which is especially suitable for constrained mobile devices; it also has an often desired feature of being able to edit the compressed format effectively on random access bases. The format has a factor four compression ratio compared to the image data format RGB888, and factor 2.66 compared to the image data format YUV422; i.e. 6 bits per pixel, thereby allowing for storage of four times larger caches using the same size of memory, i.e. much higher performance.

The image data to be transformed may be derived from an at least twice as large block of image data The block size of the block transform may be 2×2 and the at least twice as large block of image data may comprises one 4×4 Y block, one 4×4 U block and one 4×4 V block. The method may further comprise splitting the 4×4 Y block into four Y 2×2 blocks, and sub-sampling the one 4×4 U block and one 4×4 V block of image data, respectively.

The method may further comprise transforming the 4×4 block of image data into a YUV representation of image data comprising one 4×4 Y block, one 4×4 U block and one 4×4 V block of image data, respectively.

The at least twice as large block of image data may further comprise one 4×4 alpha channel block.

According to a second aspect, the above objects are achieved by a method for decoding an image, the method comprising: reading N bits from a compression data structure representing one block of compressed image data, where N>0 is an integer, the block associated with a flatness indicator bit, determining if the block is flat by observing the flatness indicator bit, if the block is flat then de-quantizing the coefficients of the block according to a first de-quantizing scheme, if the block is not flat then de-quantizing the coefficients of the block according to a second de-quantizing scheme, and performing an inverse block transform on the block data resulting in a block reconstructed image block.

The N bits may comprise bits pertaining to one DC component and more than one AC component. The method may further comprising exclusively processing the coefficients of the block pertaining to the DC component.

The block transform may be performed as a matrix operation of B=T*b*T', wherein T is a transform matrix, b is one block pixel portion of data and B is the result from the block forward transform of the one block pixel portion of data.

T may represent one from a group of a Discrete Walsh Hadamard Transform and a Discrete Cosine Transform.

The processing of the image blocks may be performed in parallel, two N-bit words are processed in a 2*N-bit operation.

The block of data may be denoted a first block of data. The method may further comprise receiving a second block of data, packing bits of the first block of data and bits of the second block of data to form a packed block of data, wherein the each coefficient from the first block of data is packed with a corresponding coefficient from the second block of data, thereby allowing for parallel calculations of the packed block of data.

The packed block of data may be obtained by shifting all bits of the first block of data and adding all bits of the second block.

In-place editing of an image may be enabled by decoding bytes of a predetermined block, modifying the decoded block, encoding the block; and storing the block over the original bytes of the block.

Thus the proposed format may be advantageous for sensors where memory may be saved memory when outputting data in a burst mode, where a pre-determined size of outputted data is required. Replacement of an image in a multi-image file is simply achieved as the images of same dimensions are of same size.

The processing of the image blocks may be performed in parallel, wherein two N-bit words are processed in one 2*N-bit operation.

The processing of the image blocks may be performed in parallel, wherein four N/2-bit bytes are processed in one 2*N-bit operation.

The processing of the image blocks may be performed in parallel, wherein eight N/2-bit bytes are processed in one 4*N-bit operation.

The processing of the image blocks may be performed in parallel, wherein four N-bit words are processed in one 4*N-bit operation.

The block size of the block transform may be 2×2 with N>15 bits. The block size of the block transform may be 3×3 with N>23 bits. The block size of the block transform may be 4×4 with N>31 bits. N may be a multiple of 8 bits.

The compression data structure may be associated with a plurality of images.

At least N−1 bits from the N-bit compression data structure may be associated with at least one lookup table.

At least N−1 bits from the N bits compression data structure may be split into at least a first bitstream of data bits and a second bitstream of data bits. The first bitstream of data bits may be associated with a first lookup table and the second bitstream of data bits may be associated with a second lookup table.

Each one of the first bitstream and the second bitstream may comprise the flatness indicator bit.

The first and second lookup tables may comprise entries representing pixel colour values representing influence of the entries on colour values on the pixels of the block.

The method may be used for generating image data to be temporarily stored, wherein the N-bit compression data structure is temporarily stored.

According to a third aspect, the above objects are achieved by method for processing a burst of a plurality of images comprising capturing a plurality of images, and processing the plurality of images, wherein the processing involves using a method as disclosed above.

According to a fourth aspect, the above objects are achieved by an apparatus comprising circuitry configured to perform a method according to the above.

According to a fifth aspect, the above objects are achieved by an apparatus for encoding an image, the apparatus comprising: a transformer for performing a 2×2 transform on 2×2 pixel portions of image data, an evaluator for evaluating resulting coefficients from each transform for flatness, a first quantizer for, if the transform is found to be flat, quantizing the result from the 2×2 transform according to a first quantizing scheme, arrange the quantized bits into 15 bits according to a first block arranging scheme, and store an indicator in the block indicating that the image block is flat, a second quantizer for, if the transform is found not to be flat, quantizing the result from the 2×2 transform according to a second quantizing scheme, arrange the quantized bits into 15 bits according to a second packet arranging scheme, and store an indicator in the block indicating that the image block is not flat, and a memory handler for writing the resulting 16 bits into a compression data structure.

According to a sixth aspect, the above objects are achieved by an apparatus for decoding an image, the apparatus comprising: a memory handler for reading 16 bits from a compression data structure representing one block of compressed image data, the block associated with a flatness indicator, a processor for determining if the block is flat by observing the flatness indicator, a first de-quantizer for, if the block is flat de-quantizing the coefficients of the block according to a first de-quantizing scheme, a second de-quantizer for, if the block is not flat, de-quantizing the coefficients of the block according to a second de-quantizing scheme, and a transformer for performing an inverse 2×2 transform on the block data resulting in a 2×2 reconstructed image block.

According to a seventh aspect, the above objects are achieved by a computer program product comprising software instructions that when run on a computer, a controller, a processor-based device, a microprocessor based device, or a mobile communications device is configured to perform a method according to the above.

There is thus disclosed a computer program product comprising software instructions that when downloaded to a computer is configured to perform image processing according to the above methods.

The computer program product may be provided in a computer-readable storage medium.

The second, third, fourth, fifth, sixth and seventh aspects may generally have the same features and advantages as the first aspect.

Other objectives, features and advantages of the present invention will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION

The present invention will now be described more fully hereinafter with reference to the accompanying drawings, in which certain embodiments are shown. Like numbers refer to like elements throughout. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
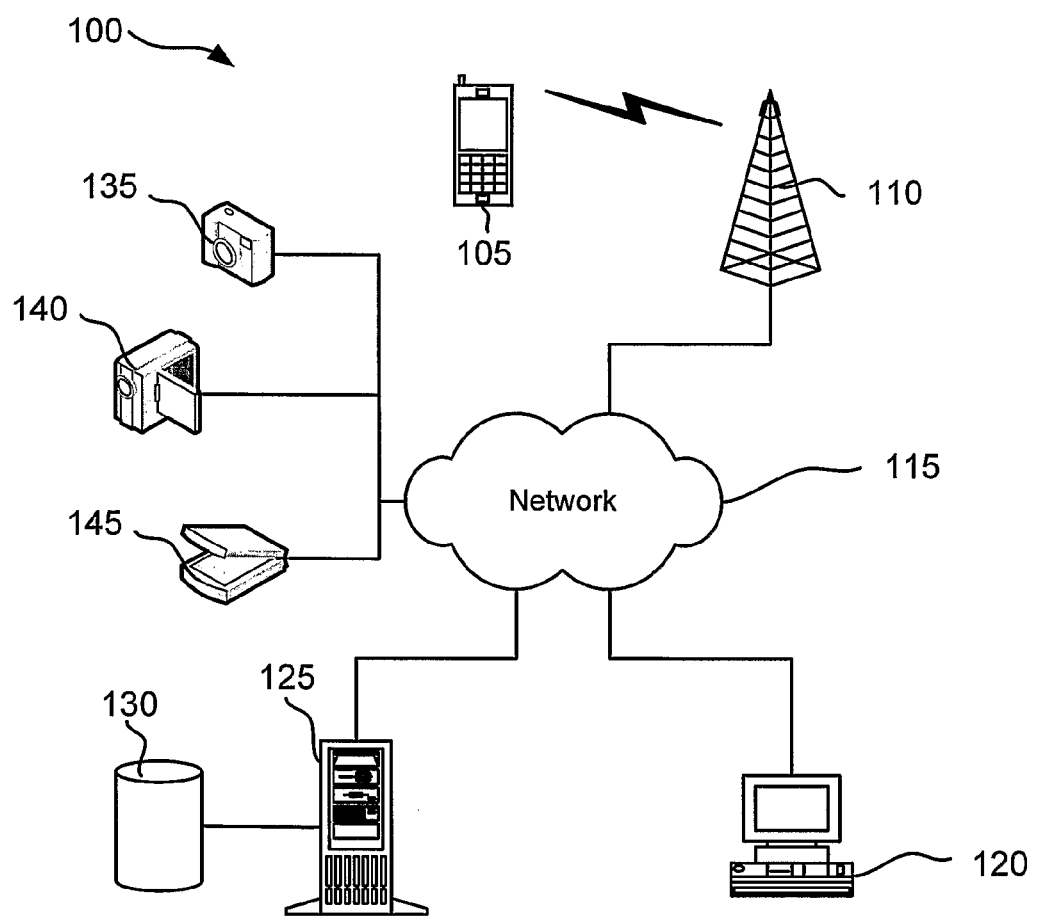
FIG. 1 is a schematic illustration of a system.

FIG. 1 is a schematic illustration of a system 100. The system 100 comprises a mobile communications device 105, such as a mobile phone or a personal digital assistant (PDA). The mobile communications device 105 is operatively connected to a network 115, which for example could be a wide area network such as the Internet, via a base station 110. The system 100 also comprises a computer 120, such as a personal computer or a laptop computer and a server 125 attached to a storage unit 130. The server 125 may be a Internet server and the storage unit 130 may store a number of web-pages and image files. Likewise the computer 130 may store image files. A digital camera 135, a digital video camera 140, and a scanner 145 are also operatively connected to the network 115. The communications of signals and data between the units in the system 100 follow standard communication schemes and protocols known to the skilled person and will not be further elaborated upon in this disclosure.

Figure 2:
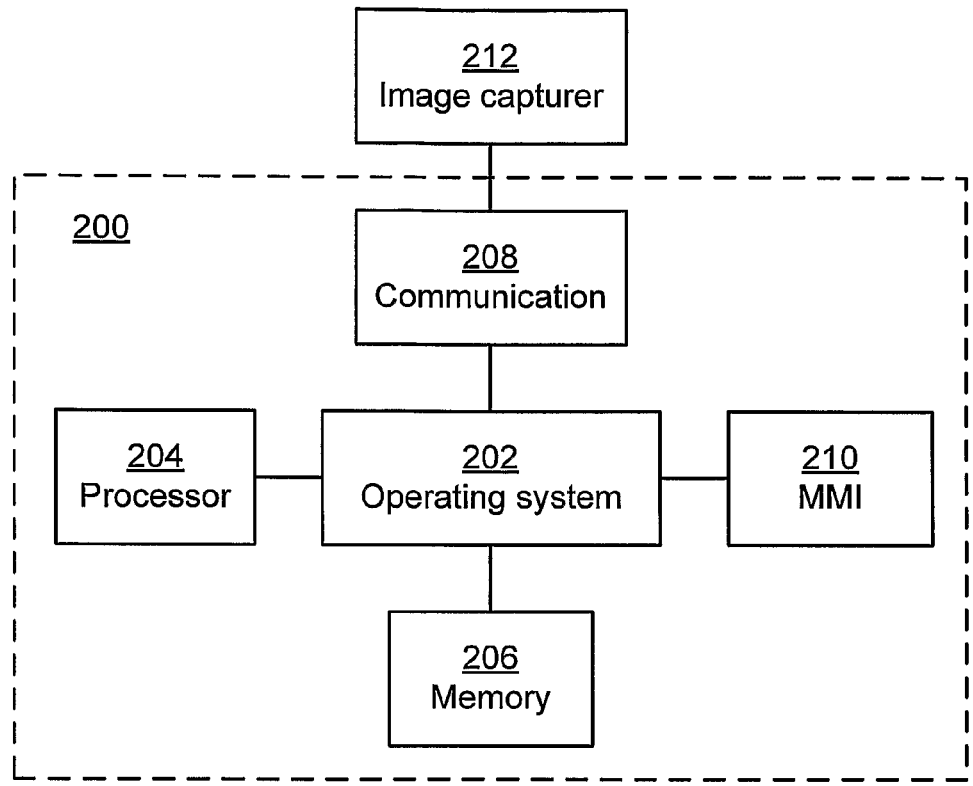
FIG. 2 is a schematic illustration of an apparatus.

FIG. 2 is a schematic illustration of a device 200 according to embodiments. The device 200 may be (part of) a mobile communications device, such as the mobile communications device 105, the computer 120, the server 125, the digital camera 135, the digital video camera 140, or the scanner 145 of FIG. 1, or the like. The apparatus 200 comprises processing means 204, such as a central processing unit and/or a dedicated image processor, storage means 206, such as a memory or a computer-readable storage medium, and communication means 208, such as a receiver and a transmitter and/or a transceiver, inter alia configured to receive input from, and deliver output to, a man-machine interface (MMI) 210, another mobile communications device or computer, or the like. The apparatus 200 is run under supervision of a operating system 202. The device 200 may also comprise image capturing means 212 such as an image capture device, such as a digital camera or a digital image scanner. The image capturing means 212 may be integrated with the device 200. Alternatively the image capturing means 212 may be comprised in a separate unit or device.

Figure 3:
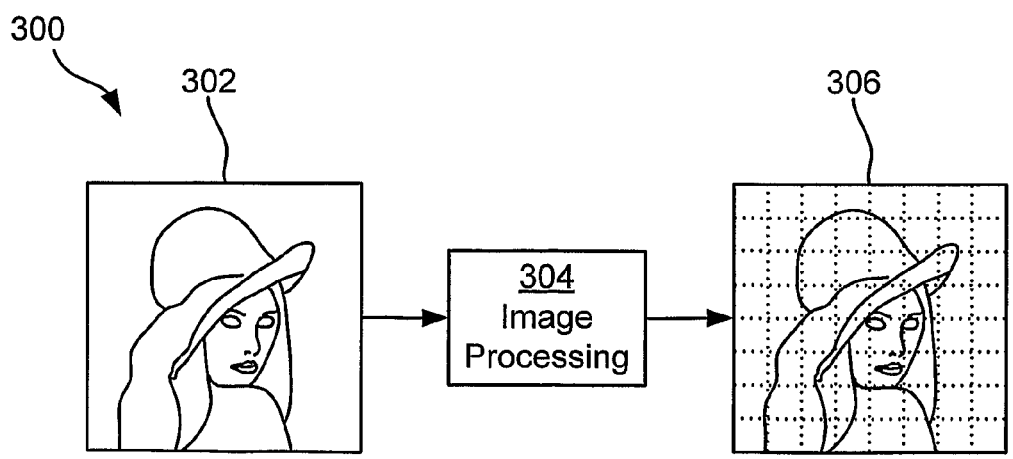
FIG. 3 is a schematic illustration of an image processing system.

FIG. 3 is a schematic illustration of an image processing system 300. The image processing system 300 comprises an original image 302 (or a representation thereof), an image processing unit 204, and a processed image 306 (or a representation thereof). It is assumed that the original image 302 is a digital image, which may have been captured by means of a digital image capturing device, such as the digital camera 135, the digital video camera 140, or the scanner 145 of FIG. 1. The original image may also be based on a computer rendering based on mathematical parameters, or a combination of inputs from several sources of image information. The process of capturing digital images is as such well known in the art and will not be further elaborated upon in this disclosure. The original image comprises a plurality of picture elements, called pixels. Typically the pixels are arranged in vertical columns and horizontal rows of the image.

The image processing unit 304 subjects the original image 302 to image processing by applying one or more image processing algorithms. Such image processing algorithms may include filtration, quantization, compression and the like, see inter alia "Digital Image Processing", by Rafael C. Gonzalez, Richard E. Woods, Prentice Hall, 2008 (3rd Edition). The image processing unit 304 may thus comprise an encoder and a decoder, respectively. The image processing unit may furthermore comprise or be operatively connected to one or more storage units (not shown), wherein unprocessed and/or processed images may be stored.

The image processing unit 304 may be implemented as a computer program product comprising one or more software components, or as a dedicated hardware unit for image processing. The software components may comprise software instructions that when run on a computer, a controller, a processor-based device, a microprocessor based device, or a mobile communications device are configured to perform the instructions associated with the image processing unit. The image processing unit 304 may thus comprise processing means, such as a controller, a microprocessor, a central processing unit and/or a dedicated image processor, storage means, such as a memory or a computer-readable storage medium, and communication means, such as a receiver and a transmitter and/or a transceiver, inter alia configured to receive input from, and deliver output to, a man-machine interface (MMI), another image processing unit 304, a mobile communications device 105, a computer 120, or the like.

Figure 4:
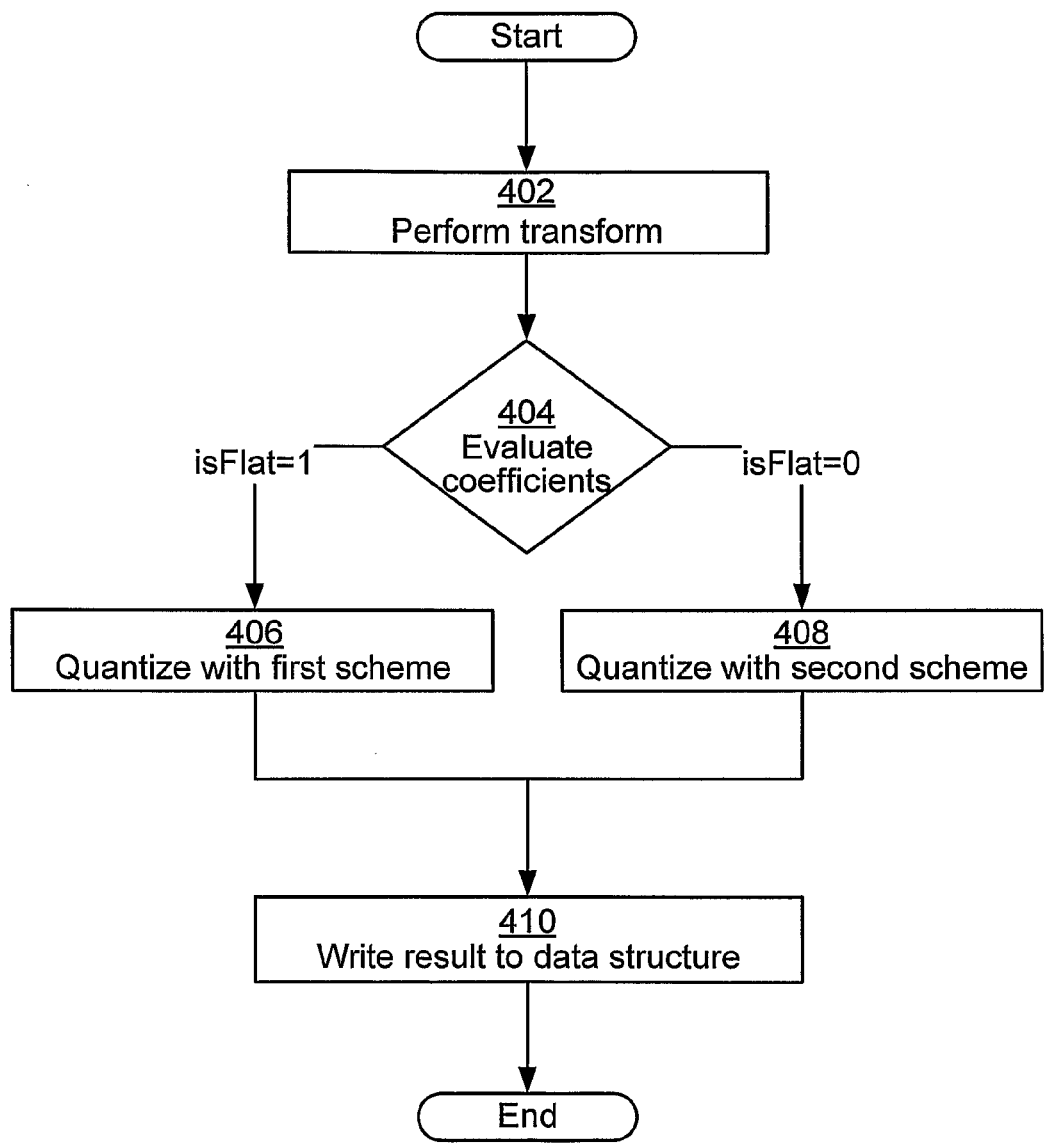
FIGS. 4-5 are flowcharts of image processing methods.
Figure 5:
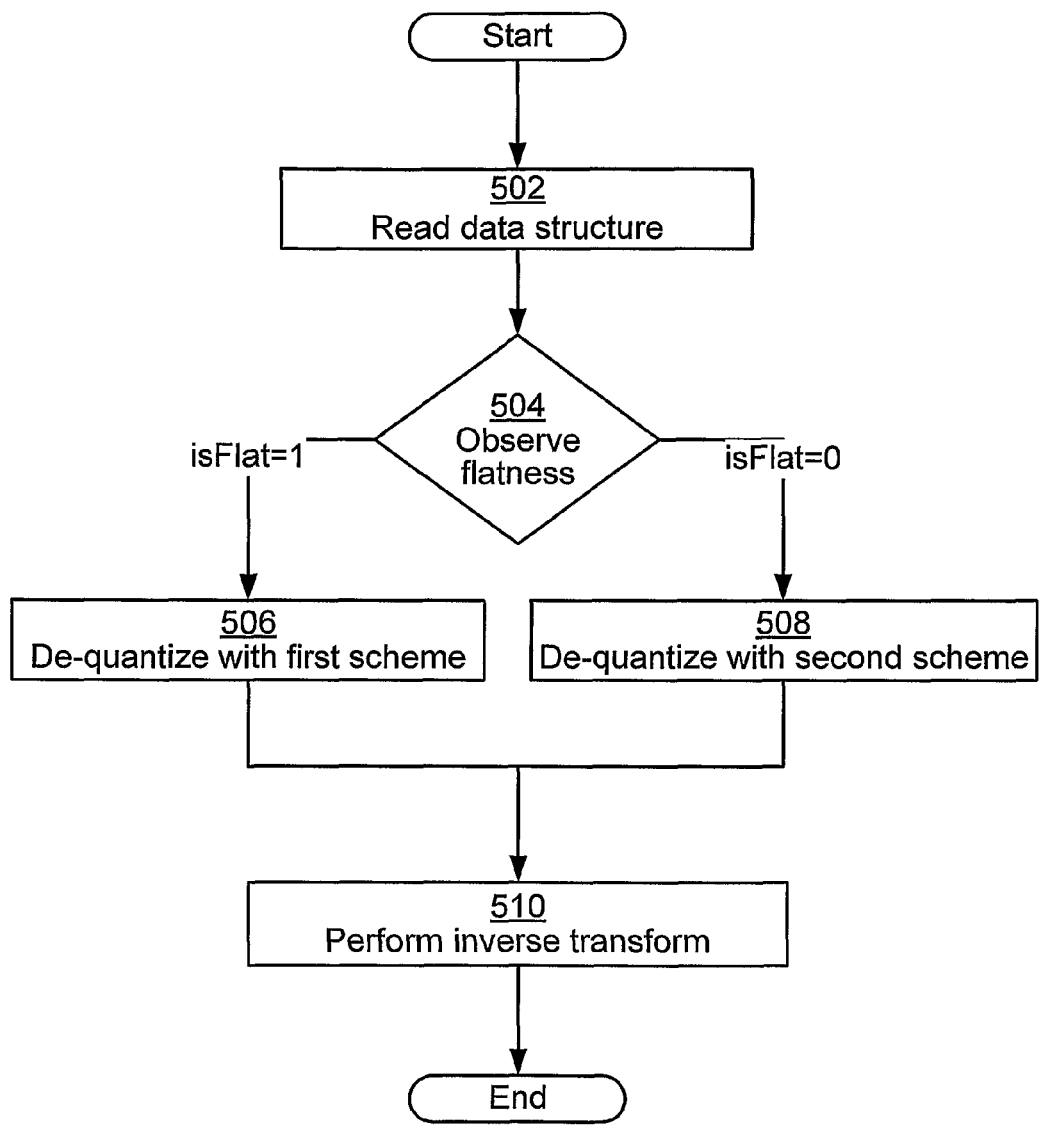

Encoding and decoding according to embodiments of the invention will be described in the following with reference to the flowcharts of FIG. 4 and FIG. 5. In the below examples a 16-bit compression data structure will be used. However, the methods described herein are equally applicable also for other compression data structures, such as (but not limited to) data structures comprising 16 bits, 24 bits or 32 bits. According to preferred embodiments the data structure comprises N bits, where N is a multiple of 8.

Colour-Spacing and Sampling

The disclosed image processing method is based on processing blocks of one or more images, such as a single image or a burst of a plurality of images. The image may be stored in memory 206. Thus in case the image is not already divided into blocks the image is divided into blocks. Preferably the blocks are of size 4×4 pixels. However, the disclosed method is likewise applicable for larger block sizes, such as block sizes of 6×6, 8×8 or 16×16 pixels.

The larger blocks (i.e. 6×6, 8×8 or 16×16 pixels) will allow for higher compression ratios than blocks of size 4×4 pixels, as they take into account a larger amount of pixels in the transformation step. Larger matrix operations are slightly more complex and thus slower the overall performance.

Each block assumed to be in a three-channel representation. Otherwise each block is converted to a three-channel image representation. The conversion is performed by sending various image data between the processor and the memory 206 under supervision of the operating system 202.

Instructions for performing the conversion may be stored in memory 206. Preferably the three-cannel representation comprises one luminance component and two chrominance components. Preferably the three-channel representation is of the YUV representation, the YCbCr representation, the YPbPr representation, or the YIQ representation, or the YAB representation described below. Alternatively the RGB representation may be used. In such a case the G-channel may, for example, serve as the luminance component. In a case the block already is in the desired representation there is no need to perform a block conversion.

The YUV format is used in JPEG. Thus if the image to be processed is in the JPEG format and the desired block representation is the YUV format there is no need to perform a block conversion. Conversion between different image representations, such as conversion between RGB and YUV are well known in the art and will hence not be described in further detail.

In the below description the components Y, U, and V, should be considered to be any colour representation having three channels, such as YCbCr, YPbPr, or YIQ, or for examples, colour representations obtainable by transformation from the preceding formats (including RGB) wherein the transform matrix comprises only zeros ones, and powers of two. For example, the YAB transform is defined from RGB as follows:

$$\begin{bmatrix} Y \\ A \\ B \end{bmatrix} = \begin{bmatrix} 1/4 & 1/2 & 1/2 \\ 1/2 & -1 & 1/2 \\ -1 & 0 & 1 \end{bmatrix} \begin{bmatrix} R \\ G \\ B \end{bmatrix}$$

Similarly, RGB coefficients may be found from YAB coefficients according to the following matrix operation $$\begin{bmatrix} R \\ G \\ B \end{bmatrix} = \begin{bmatrix} 1 & 1/2 & -1/2 \\ 1 & -1/2 & 0 \\ 1 & 1/2 & 1/2 \end{bmatrix} \begin{bmatrix} Y \\ A \\ B \end{bmatrix}$$

It is to be noted that YAB values may be obtained from RGB values by using forward and backward transform matrices comprising values in the set $\{0, \frac{1}{4}, -\frac{1}{2}, \frac{1}{2}, -1, 1\}$, i.e. the values 0, 1 and negative powers of two. This may be advantageous since the matrix operations may be implemented using only binary shift operations.

Two of the three transformed components are sub-sampled to a desired resolution unless already in the desired resolution. Preferably the chrominance components (such as the U and V components if the YUV representation is used) are sub-sampled. In a case the original blocks of the two components are of size 4×4 pixels the blocks are sampled down to 2×2 blocks. In case the original blocks of the two components are of size 8×8 pixels the blocks are sampled down to 4×4 blocks or 2×2 blocks, and so on.

The remaining (third) component (preferably the luminance component, such as a 4×4 Y component) is treated as if it consisted of four sub-sampled blocks (such as four 2×2 blocks in case the original block size is 4×4 pixels), resulting in total six (2×2) blocks for the entire (4×4) block. Hereinafter a sub-sampled block in the YUV format will be noted as [Y Y Y Y U V] where "Y" represents one 2×2 Y block and so on. Operations of encoding and decoding may be stored in memory 206 and may be performed in processor 204. The program code evokes image data to be loaded from and stored in memory 206 and processed by processor 204.

Transformation Coding

Denote by b a sub-sampled block. In case 2×2 blocks are used b can be written as $$b = \begin{bmatrix} b_1 & b_2 \\ b_3 & b_4 \end{bmatrix}.$$

In a step 402 each sub-sampled block is transformed with a two-dimensional transform resulting in a new block B of the same size:

$$B = TbT',$$

where T is the forward transform matrix having a transpose T'. The forward transform function may, for example, be a Discrete Walsh Hadamard Transform (DWHT), i.e. for a block size of 2×2 pixels $$T = \begin{bmatrix} 1 & 1 \\ 1 & -1 \end{bmatrix}.$$

The transformation may be performed by a transformer. The DWHT transform is an exemplary transform, other transforms that can be used are the discrete cosine transform (DCT), or variations of DCT with discreetly rounded coefficients being similar to DWHT. The choice of a transform is more important for transforms larger than 2×2 transforms. The transformer may be implemented in the processor 204.

Evaluation of Flatness

For 8 bit input data and with $$B = \begin{bmatrix} B_1 & B_2 \\ B_3 & B_4 \end{bmatrix}$$

the ranges Range ($B_j$), $j \geq 1$ for the transformed blocks $B_j$, $j \geq 1$ become as follows:

Range ($B_1$)={0 . . . 1024} and

Range ($B_2$)=Range ($B_3$)=Range ($B_4$)={−512 . . . 512}. $B_1$ may thus be regarded as a DC coefficient whereas the coefficients $B_j$, $j \geq 2$ may be regarded as AC coefficients. As is known in the art the DC component relates to the mean value of the pixels represented by the B-matrix and the AC components relate to spatial frequencies present in the blocks of pixels represented by the B-matrix.

In a step 404 each transformed sub-sampled block is evaluated for a flatness condition by in the processor 204 determining a parameter pertaining to the amount of high frequency content in each transformed AC coefficient. The block is then considered flat if a flatness condition is met. The evaluation may be performed by an evaluator. The evaluator may be implemented in the processor 204.

Typically a flatness condition reflects the actual range of values in the transformed AC coefficients. For example one flatness condition could be to determine $B_2$ to be flat in case the values of $B_2$ are in the interval {−255, . . . , 255}. For example one flatness condition could be to determine $B_3$ to be flat in case the values of $B_3$ are in the interval {−255, . . . , 255}. For example one flatness condition could be to determine $B_4$ to be flat in case the values of $B_4$ are in the interval {−63, . . . , 63}. Tighter intervals may also be used, such as the intervals $\{-127, \ldots, 127\}$ or $\{-63, \ldots, 63\}$ for $B_2$ and $B_3$ whereas the intervals $\{-31, \ldots, 31\}$ or $\{-15, \ldots, 15\}$ may be used for $B_4$.

The chosen interval affects how large values can be coded; respectively what granularity such values can have for each coefficient. Thus choosing small interval does not allow representing of a rapid change in value, but it will allow high granularity for small changes in values.

The entire transformed block may then be considered as flat if all $B_j$, $j \geq 2$ fulfil the flatness condition.

For the ranges $\{-255, \ldots, 255\}$ for $B_2$ and $B_3$, and $\{-63, \ldots 63\}$ for $B_4$ this condition may be written as follows in pseudo-code:

$$\text{isFlat} = -256 < B2 \,\&\&\, B2 < 256 \,\&\&\, -256 < B3 \,\&\&\, B3 < 256 \,\&\&\, -64 < B4 \,\&\&\, B4 < 64,$$

where the parameter isFlat is assigned the value 1 if the flatness condition is fulfilled and the value 0 if the flatness condition is not fulfilled. the parameter isFlat may be stored in memory 206.

Quantization and Packing

Different quantizing schemes (or schemes having the same quantizer but using different quantizer boundaries) are deployed for the flat and not flat blocks, respectively. Put in other words, if the transform is found to be flat then the result from the transform is quantized according to a first quantizing scheme, whereas if the transform is found not to be flat then the result from the transform is quantized according to a second quantizing scheme being different from the first quantizing scheme.

Firstly the coefficients in the transformed sub-blocks are range shifted, by in the processor 204 executing shift operations, to become positive 0 . . . 1023.

If the transform is found to be flat then the result from the 2×2 transform is quantized according to a first quantizing scheme, step 406. Firstly the coefficients of each block are right shifted. According to one embodiment the $B_1$ coefficient is shifted three bits, the $B_2$ coefficient is shifted five bits, the $B_3$ coefficient is shifted five bits, and the $B_4$ coefficient is shifted zero bits, as follows:

$$Bq = \begin{bmatrix} B_1 & B_2 \\ B_3 & B_4 \end{bmatrix} >> \begin{bmatrix} 3 & 5 \\ 5 & 0 \end{bmatrix},$$

where the symbol ">>" denotes the right-shift operator. For example the expression $Bq_1 = B_1 >> 3$ assigns $Bq_1$ the result of shifting $B_1$ to the right by three bits.

The purpose of shifting is to achieve 15 bits of total information per block, so that the block, including the flatness indicator, can be written as 16 bits to a storage structure, such as a memory. The more bits utilized, the more accurately the coefficient will be represented.

The shifted bits are then quantized according to the following bit allocation:

$$\begin{bmatrix} 7 & 4 \\ 4 & 0 \end{bmatrix}$$

bits per coefficient. That is $Bq_1$ is quantized with 7 bits, and so on. I.e. according to one embodiment $Bq_4$ is set to zero. Other bit allocations have also been tested on experimental image data. The above bit allocation works well and is therefore preferable according to one embodiment. For example, known scalar quantization may used. Reproducer values thereto may be stored in memory 206.

The matrix representing the quantized coefficients is then scanned to form a vector of coefficients. The coefficients of the vector are then converted into bits to form a bit stream and the result is written to a data structure which may be stored in memory 206, step 410. The result may be written by a memory handler. The memory handler may be part of the operating system 202. The first bit of the bit stream representing the encoded block may be set to one in order to indicate a flat block.

Below is one bit representation illustrated:

$$Bq = 0x8000 | (B_1 << 8) | (B_2 << 4) | B_3$$

where the symbol "<<" denotes the left-shift operator, and "|" denotes a logic OR operation. For example the expression $B1 >> 8$ denotes a left shift of B1 by eight bits. Thus Bq forms the following 16-bit sequence: 1 (1 bit) followed by B1 (7 bits) followed by B2 (4 bits) followed by B3 (4 bits).

If the transform is found not to be flat then the result from the 2×2 transform is quantized according to a second quantizing scheme, step 408. If the block is not considered flat, the transformed block is right shifted as follows:

$$Bq = \begin{bmatrix} B_1 & B_2 \\ B_3 & B_4 \end{bmatrix} >> \begin{bmatrix} 6 & 6 \\ 6 & 7 \end{bmatrix},$$

and quantized with a bit allocation of $$\begin{bmatrix} 4 & 4 \\ 4 & 3 \end{bmatrix}$$

bits per coefficient. The first bit of the bit stream representing the encoded block may be set to zero in order to indicate a non-flat block:

$$Bq = (B_1 >> 11) | (B_2 >> 7) | (B_3 >> 3) | B_4.$$

Thus, in this case Bq forms the following 16-bit sequence: 0 (1 bit) followed by B1 (4 bits) followed by B2 (4 bits) followed by B3 (4 bits) followed by B4 (4 bits). The result is then written to a data structure, step 410. The data structure may be stored in memory 206.

The steps 402, 404, 406, 408 and 410 may then be repeated for other blocks in the image. As disclosed above the first bit of the bit stream representing the encoded block is either set to one or zero in order to indicate a flat or a non-flat block, respectively. Alternatively the bit defining each block to be flat or non-flat may be stored separately. Thus, In order to store each block as two words of eight bits or one long word of 16 bits one additional bit may be used in the bit allocation schemes disclosed above.

Similarly the steps performed for the 4×4 block, resulting in a number of 2×2 blocks, can be performed for a 6×6 block, 8×8 block, or even 16×16 blocks. In such cases the number of encoded bits becomes larger for the block, where the 3×3 sub-blocks can be configured to become at least 24 bits large, and the 4×4 sub block to become at least 32 bits large.

In some use cases it may be important to have an alpha channel connected to the format. The alpha channel is normally used as an opacity channel. For example, if a pixel has a value of 0% in its alpha channel, it is fully transparent, whereas a value of 100% in the alpha channel gives a fully opaque pixel. Values between 0% and 100% make it possible for pixels to show through a background. Using an alpha channel may allow for easy image compositing. Alpha channel values can be expressed as a percentage, integer, or real number between 0 and 1 like RGB parameters. It is in general relatively simple to facilitate for using an alpha channel by creating four additional "gray scale" 2×2 alpha blocks per 4×4 pixel block to represent alpha, or to use only one that is up-sampled to 4×4 when decoding, Alternatively, some of the bits representing coefficients in the transform may be dedicated to representing the alpha channel.

Decoding:

The decoding operation is inverse to the encoding and should be easily understood from the description of the encoding above. In particular the decoding may comprise steps associated with the encoding steps described above, but performed in reversed order.

In a step 502 16 bits are read from a compression data structure representing one block of compressed image data. The bits may be read by the memory handler. The block is associated with a flatness indicator. By observing the flatness indicator (for example the flatness indicator being a one or a zero, where the one represents a block being flat and the zero represents the block not being flat) it is determined in a step 504 if the block is flat or not, The determination may be performed by the processor 204.

If the block is flat then the coefficients of the block are de-quantized according to a first de-quantizing scheme in a step 506, The first de-quantizing scheme corresponds to the first quantizing scheme disclosed above. First the flatness bit (the first bit of the 16-bit sequence) is discarded. Then the remaining 15 bits are divided into the four coefficients of the 2×2 block according to the bit allocation used for flat blocks. In the example above the seven first bits of the 15 bits represent the first (transformed) coefficient.

If the block is not flat then the coefficients of the block are de-quantized according to a second de-quantizing scheme in a step 508. The second de-quantizing scheme corresponds to the second quantizing scheme disclosed above. First the flatness bit (the first bit of the 16-bit sequence) is discarded. Then the remaining 15 bits are divided into the four coefficients of the 2×2 block according to the bit allocation used for non-flat blocks. In the example above the four first bits of the 15 bits represent the first (transformed) coefficient.

In order to compensate for the Walsh-Hadamard forward transformation an inverse transformation is applied to the 2×2 block. Thus in a step 510 an inverse 2×2 transform on the block data resulting in a 2×2 reconstructed image block is performed. The U and V blocks may then be interpolated from 2×2 blocks to 4×4 blocks and the four 2×2 Y-blocks are re-ordered to form one 4×4 Y block. Then the reconstructed YUV representation may be inverse transformed to the RGB representation for viewing on a display.

The above steps are then repeated for the remaining sequences of 16 bits for the original 4×4 block in order to reproduce one encoded area of 4×4 pixels. The entire procedure may then be repeated for the remaining areas of 4×4 pixels in the image.

Next follows an alternative method of decoding. The decoded information is stored in number of 16-bit entries depending on the sampling that has been used. Each 16-bit entry encodes four values of a certain colour component, Thus more than one 16-bit entry is needed to decode a complete RGB pixel. One element of the proposed format is that it is linear so it can be partially decoded using multiple small lookup tables.

For the purpose of clarity, a specific packing format is used for the 16-bit containing flatness indicator, and the transformed values. Any order could be used.

Consider a sequence of bits representing encoded coefficients of a flat block. For explanatory purposes, assume that the bits are labelled to indicate that they belong to the following coefficients:

$$\begin{bmatrix} D & H \\ V & X \end{bmatrix}$$

A flat 16-bit sequence thus may have the following form:
 1DDDDDDDHHHHVVVV,
and the non-flat 16-bit sequence may have the following form:
 0DDDDHHHHVVVVXXX.

It is possible to form a multitude of lookup tables that include pre-calculated values for the looked up bits in any desired colour format.

One way to perform the lookups is to determine the flatness of the image by looking at the flat bit, and choose a proper lookup table based on that, and then divide the remaining bits between one or more bit sequences for one or more lookup tables. Or one may include the flatness bit in the bit sequence for the one or more lookup tables. In that case no explicit determining of the flatness bit is needed.

One such splitting of the 16-bit number into three five bit lookups with a flatness bit is illustrated below, where x illustrates the flatness bit, and the sequence a . . . o illustrates the other 15 bits of the original 16-bit entry:
 xabcdefghijklmno
The new three entries for three different lookups are illustrated below:
 xabcde, xfghij, xklmno
Depending on whether the image is flat or non-flat, different bits have different meanings. For flat images using the above disclosed bit allocation, the contents would be the following:
 1DDDDD, 1DDHHH, 1HVVVV
Each bit sequence starts with flatness equaling one, and then the first sequence comprises D's 5 most significant bits, the second sequence's flat bit is followed by D's least significant bits and H's most significant bits, and the final sequence's flat bit is followed by H's least significant bit and V's all bits.

Similarly for non-flat images using the above disclosed bit allocation the sequence would be:
 0DDDDH, 0HHHVV, 0VVXXX
As the flatness bit determines which lookup table to go to, each of the remaining bits are linear, and can be processed separately (or in groups, in this case groups of five), and added together in a final pass.

A number of lookup tables (LUT) (three in this case, for each of the three bit sequences: HI, MID, LOW, where HI is the first five-bit sequence, MID is the second five-bit sequence and LOW is the third five-bit sequence; i.e. HI is either 1DDDDD and/or 0DDDDH) can be created with the above bit sequence as the key. Such lookup table entry may include fully decoded values for the particular bit sequences effect on the encoded pixel depending on the format (such as YUV/YAB/ . . . ) in the block. Such lookup table entry may alternatively include fully decoded and transformed values for the particular bit sequences effect on the encoded pixel in a transformed colour domain (RGB/RGB565/ . . . ) in the block. Thus the lookup table may point to pre-calculated RGB values for the specific decoded colour channel.

To exemplify further, in order to decode a 2×2 block into RGB pixels the following operations may be performed (in pseudo code); it is assumed for the sake of clarity, that each R, G, and B entry contains values for all four pixels of the 2×2 block, and where addition of such entry means addition of all four values. Note, the 16-bit value could be split into other sizes as well, such as 9+9 bits, or, for example, in the most extreme case 16*1 bits, or only one large LUT for the entire 16 bits on systems with large caches, or no caches at all.

Example:

y1=the 16-bit entry for the first y1 2×2 block l1=y1>>10; //first bit sequence

[y1_r,y1_g,y1_b]=y_highbits[l1];

l2=(y1>>15<<5)|((y1>>5)&0x1f)); //second bit sequence

[r2,g2,b2]=y_midbits[l2];

l3=(y1>>15<<5)|(y1& 0x1f); //second bit sequence

[r3,g3,b3]=y_lowbits[l3];

y1_r=y1_r+r2+r3; y1_g=y1_g+g2+g3; y1_b=y1_b+b2+b3.

In the above example the proper bits are extracted for each 5 bits, and the flatness flag is appended to the beginning to form 6 bits. The resulting value is looked up in a list (in the example above denoted "highbits", "midbits" and "lowbits", respectively) containing properly calculated RGB (could be YUV as well, but not in this example) values for all pixel values of the entire block. The RGB values are the ones that are influenced by the data stored in the 16 bit word; the final values will be influenced by more 16 bit values as well, i.e. the U/V values, which also have to be added in the end.

Similarly, same operation is performed for rest of the Y coefficients (Y2-Y4), and U and V. In the final stage the RGB values for the U/V blocks are added to the RGB values of the Y block, and a final RGB value is produced for the particular pixel.

The advantage of the above method is that by performing a few lookups and additions, one can expand the entire 4×4 block into 4×4 RGB values; and since the colour channels or all values of a block can be processed in parallel within a 32-bit operation, the performance is outstanding. The method requires exceptionally small amount of cache memory, as the LUTs can be made small; 64 entries per LUT in the example above.

Random Access

As the format is not a variable length compression format it is possible to calculate where each compressed 4×4 block reside, and modify that data.

The format may, for example, create a 16-bit word for each 2×2 block, In other words, a 4×4 YUV block is compressed to exactly 6 words, i.e. 12 bytes.

To modify an area of the image, such as panning, zooming, warping, cropping, etc, the processing means can easily find any 4×4 block simply by looking at an address of 12*block_number, where block_number denotes the number of the block in the image. For example, the blocks may be numbered from left to right and then row by row, and so on. The area can then be decoded, modified, and re-encoded and stored in the same position as the original information, thereby enabling easy editing of areas in the image.

It is also possible to create a putpixel/getpixel function that directly manipulates the desired coefficients to enable the effect.

Parallelism

One of the advantages of the disclosed method is that allows for simple implementations for an encoder and a decoder that can perform respective operations for two blocks in parallel.

The parallel calculations may be accomplished by packing data from a first block into the high 16 bits of a 32 bit word, and packing data from a second block into the lower 16 bits of the 32 bit word. Advantageously the pair of first and second blocks are adjacent blocks in the image to be encoded. Such a packaging may thus be performed as follows:

$$A = \begin{bmatrix} A_1 & A_2 \\ A_3 & A_4 \end{bmatrix}, B = \begin{bmatrix} B_1 & B_2 \\ B_3 & B_4 \end{bmatrix},$$

$$P = \begin{bmatrix} A_1 << 16 \mid B_1 & A_2 << 16 \mid B_2 \\ A_3 << 16 \mid B_3 & A_4 << 16 \mid B_4 \end{bmatrix},$$

wherein A is the first block, B is the second block and P is a block comprising the data from both the first block and the second block by shifting the bits of the first block and then adding the bits of the second block. It may then be possible to perform many of the calculations for two blocks in parallel delivering an outstanding performance as long as the operations will not result the new P coefficients to become large/small enough to overflow/underflow to the next coefficient:

Example:

A1=0x23; B1=0x75;

P1=0x00230075;

P1*0x0020=0x04600EA0, the values are still isolated from each other, and can be retrieved through:
      A1=P1>>16; B1=P1&0xffff;

P1*0x0250=0x50f10e90, the second value (0x10e90) overflowed:

A1=0x50f1, wrong—should be 0x50f0,

A2=0x0e90, wrong—should be 0x10e90;

The above example illustrates how a 32-bit value may be created from two 8-bit values, with zero bytes isolating them from each other, so that overflow in addition or multiplication will not spill over to the other byte. This works always if the multiplied value is less or equal for 0x101. The second example fails because of the overflow.

The above disclosed computer program product may comprise software instructions that when downloaded to a computer, such as the apparatus 1000, are configured to perform a method according to the above. Alternatively, the software instructions may be separately distributable to be distributed in a computer network. The computer program product may be provided in a computer-readable storage medium, such as a random access memory (RAM), a read-only memory (ROM), a universal series bus (USB) product, such as a memory stick, or the like.

The inventive format and method may advantageously be applied in applications such as caching and compressed storing of multitude of graphical objects off-screen in a graphical application. Bitmaps in products like Flash-Lite could be stored internally in this format. Enabling editing of images in compressed format due to the random access capabilities of the format.

The invention has mainly been described above with reference to a certain examples. However, as is readily appreciated by a person skilled in the art, other examples than the ones disclosed above are equally possible within the scope of the invention, as defined by the appended patent claims.

The invention claimed is:

1. An apparatus comprising at least a processor, a memory in communication with said processor, and computer coded instructions stored in said memory which, when executed by the processor, cause the apparatus to perform:
performing a block transform on blocks of pixel portions of image data;
evaluating resulting coefficients from each transform for flatness;
wherein in the instance of a flat transform, quantizing the result from the block transform according to a first quantizing scheme, by arranging the quantized bits into N−1 bits according to a first image block arranging scheme, where N>0 is an integer, and causing an indicator to be stored in the block indicating that the image block is flat, and
wherein in the instance of a not flat transform, quantizing the result from the block transform according to a second quantizing scheme, by arranging the quantized bits into N−1 bits according to a second image block arranging scheme, and causing an indicator to be stored in the block indicating that the image block is not flat; and
encoding said image data by performing with a processor writing the resulting N bits into a compression data structure.

2. An apparatus comprising at least a processor, a memory in communication with said processor, and computer coded instructions stored in said memory which, when executed by the processor, cause the apparatus to perform:
reading N bits from a compression data structure representing one block of coefficients of compressed image data, where N>0 is an integer, and wherein the block is associated with a flatness indicator bit;
determining if the block is flat by observing the flatness indicator bit; wherein
in the instance that the block is flat, de-quantizing the coefficients of the block according to a first de-quantizing scheme, and
in the instance that the block is not flat, de-quantizing the coefficients of the block according to a second de-quantizing scheme; and
decoding the image by performing with a processor on the block data of de-quantized coefficients an inverse block transform resulting in a block of reconstructed pixel portions of image data.

3. A computer program product comprising at least a computer readable storage medium having computer coded instructions stored therein, said instructions when executed by a processor, causing an apparatus to perform:
performing a block transform on blocks of pixel portions of image data;
evaluating resulting coefficients from each transform for flatness;
wherein in the instance of a flat transform, quantizing the result from the block transform according to a first quantizing scheme, by arranging the quantized bits into N−1 bits according to a first image block arranging scheme, where N>0 is an integer, and causing an indicator to be stored in the block indicating that the image block is flat, and
wherein in the instance of a not flat transform, quantizing the result from the block transform according to a second quantizing scheme, by arranging the quantized bits into N−1 bits according to a second image block arranging scheme, and causing an indicator to be stored in the block indicating that the image block is not flat; and
encoding said image data by performing with a processor writing the resulting N bits into a compression data structure.

4. A computer program product comprising at least a computer readable storage medium having computer coded instructions stored therein, said instructions when executed by a processor, causing an apparatus to perform:
reading N bits from a compression data structure representing one block of coefficients of compressed image data, where N>0 is an integer, and wherein the block is associated with a flatness indicator bit;
determining if the block is flat by observing the flatness indicator bit;
in the instance that the block is flat, de-quantizing the coefficients of the block according to a first de-quantizing scheme, and
in the instance that the block is not flat, de-quantizing the coefficients of the block according to a second de-quantizing scheme; and
decoding the image by performing with a processor on the block data of de-quantized coefficients an inverse block transform resulting in a block of reconstructed pixel portions of image data.

5. A method comprising:
performing a block transform on blocks of pixel portions of image data;
evaluating resulting coefficients from each transform for flatness;
wherein in the instance of a flat transform, quantizing the result from the block transform according to a first quantizing scheme, by arranging the quantized bits into N−1 bits according to a first image block arranging scheme, where N>0 is an integer, and causing an indicator to be stored in the block indicating that the image block is flat;
wherein in the instance of a not flat transform, quantizing the result from the block transform according to a second quantizing scheme, by arranging the quantized bits into N−1 bits according to a second image block arranging scheme, and causing an indicator to be stored in the block indicating that the image block is not flat; and
encoding said image data by performing with a processor writing the resulting N bits into a compression data structure.

6. The method according to claim 5, wherein the image data to be transformed is derived from an at least twice as large block of image data.

7. The method according to claim 6, wherein the block size of the block transform is 2×2 and said at least twice as large block of image data comprises one 4×4 Y block, one 4×4 U block and one 4×4 V block, said method further comprising
splitting said 4×4 Y block into four 2×2 Y blocks, and
sub-sampling said one 4×4 U block and one 4×4 V block of image data, respectively.

8. The method according to claim 7, further comprising
transforming said 4×4 block of image data into a YUV representation of image data comprising one 4×4 Y block, one 4×4 U block and one 4×4 V block of image data, respectively.

9. The method according to claim 8, wherein said at least twice as large block of image data further comprises one 4×4 alpha channel block.

10. The method according to claim 5, wherein the block transform is performed as a matrix operation of $B=T*b*T'$, wherein T is a transform matrix, b is one block pixel portion of data and B is the result from the block forward transform of said one block pixel portion of data.

11. The method according to claim 5, wherein the block transform is performed as a matrix operation of B=T*b*T', wherein T is a transform matrix, b is one block pixel portion of data and B is the result from the block forward transform of said one block pixel portion of data, and wherein T represents one from a group of a Discrete Walsh Hadamard Transform and a Discrete Cosine Transform.

12. The method according to claim 5, wherein the processing of the image blocks is performed in parallel, where two N-bit words are processed in a 2*N-bit operation.

13. The method according to claim 5, wherein the block of data is denoted a first block of data, said method further comprising receiving a second block of data, and packing bits of the first block of data and bits of the second block of data to form a packed block of data, wherein each coefficient from the first block of data is packed with a corresponding coefficient from said second block of data, thereby allowing for parallel calculations of said packed block of data.

14. The method according to claim 5, wherein the block of data is denoted a first block of data, said method further comprising receiving a second block of data, and packing bits of the first block of data and bits of the second block of data to form a packed block of data, wherein each coefficient from the first block of data is packed with a corresponding coefficient from said second block of data, thereby allowing for parallel calculations of said packed block of data; and wherein said packed block of data is obtained by shifting all bits of said first block of data and then adding all bits of said second block.

15. The method according to claim 5, wherein the block size of the block transform is one from a group of:
2×2, and where N>15 bits,
3×3, and where N>23 bits, and
4×4, and where N>31 bits.

16. The method according to claim 5, wherein said compression data structure is associated with a plurality of images.

17. The method according to claim 5, wherein at least N−1 bits from said N bits compression data structure is split into at least a first bitstream of data bits and a second bitstream of data bits, and wherein said first bitstream of data bits is associated with a first lookup table and wherein said second bitstream of data bits is associated with a second lookup table, and wherein each one of said first bitstream and said second bitstream comprises the flatness indicator bit.

18. The method according to claim 5, wherein at least N−1 bits from said N bits compression data structure is split into at least a first bitstream of data bits and a second bitstream of data bits, and wherein said first bitstream of data bits is associated with a first lookup table and wherein said second bitstream of data bits is associated with a second lookup table, and wherein said first and second lookup tables comprise entries representing pixel colour values representing influence of the entries on colour values on the pixels of said block.

19. A method comprising:
reading N bits from a compression data structure representing one block of coefficients of compressed image data, where N>0 is an integer, and wherein the block is associated with a flatness indicator bit;
determining if the block is flat by observing the flatness indicator bit;
in the instance that the block is flat, de-quantizing the coefficients of the block according to a first de-quantizing scheme;
in the instance that the block is not flat, de-quantizing the coefficients of the block according to a second de-quantizing scheme; and
decoding the image by performing with a processor on the block data of de-quantized coefficients an inverse block transform resulting in a block of reconstructed pixel portions of image data.

20. The method according to claim 19, wherein said N bits comprise bits pertaining to one DC component and more than one AC component, said method further comprising:
exclusively processing the coefficients of the block pertaining to the DC component.

21. The method according to claim 19, wherein in-place editing of an image is enabled by decoding bytes of a predetermined block, modifying the decoded block, encoding the block, and storing the block over the original bytes of the block.

22. The method according to claim 19, wherein N is a multiple of 8.

23. The method according to claim 19, wherein at least N−1 bits from said N-bit compression data structure are associated with at least one lookup table.

24. The method according to claim 19, wherein at least N−1 bits from said N bits compression data structure are split into at least a first bitstream of data bits and a second bitstream of data bits, and wherein said first bitstream of data bits is associated with a first lookup table and wherein said second bitstream of data bits is associated with a second lookup table.

25. The method according to claim 19, wherein the block transform is performed as a matrix operation of B=T*b*T', wherein T is a transform matrix, b is one block pixel portion of data and B is the result from the block forward transform of said one block pixel portion of data, and wherein T represents one from a group of a Discrete Walsh Hadamard Transform and a Discrete Cosine Transform.

26. The method according to claim 19, wherein the block of data is denoted a first block of data, said method further comprising receiving a second block of data, and packing bits of the first block of data and bits of the second block of data to form a packed block of data wherein each coefficient from the first block of data is packed with a corresponding coefficient from said second block of data, thereby allowing for parallel calculations of said packed block of data; and wherein said packed block of data is obtained by shifting all bits of said first block of data and then adding all bits of said second block.

27. The method according to claim 19, wherein at least N−1 bits from said N bits compression data structure are split into at least a first bitstream of data bits and a second bitstream of data bits, and wherein said first bitstream of data bits is associated with a first lookup table and wherein said second bitstream of data bits is associated with a second lookup table, and wherein each one of said first bitstream and said second bitstream comprises the flatness indicator bit.

28. The method according to claim 19, wherein at least N−1 bits from said N bits compression data structure are split into at least a first bitstream of data bits and a second bitstream of data bits, and wherein said first bitstream of data bits is associated with a first lookup table and wherein said second bitstream of data bits is associated with a second lookup table, and wherein said first and second lookup tables comprise entries representing pixel colour values representing influence of the entries on colour values on the pixels of said block.

* * * * *